United States Patent [19]
Bielefeldt

[11] B 4,001,121
[45] Jan. 4, 1977

[54] CENTRIFUGAL TREATMENT OF FLUIDS

[75] Inventor: Ernst-August Bielefeldt, Neumunster, Germany

[73] Assignee: Messerschmitt-Bolkow-Blohm GmbH - Division Hamburger Flugzeugbau, Hamburg, Germany

[22] Filed: Feb. 8, 1973

[21] Appl. No.: 330,719

[44] Published under the second Trial Voluntary Protest Program on March 16, 1976 as document No. B 330,719.

[52] U.S. Cl. .................. 210/512 R; 55/437; 55/443; 55/459 R; 55/460; 55/461; 55/463; 209/144; 209/211; 210/84; 210/512 M

[51] Int. Cl.² ........................................ B01D 21/26

[58] Field of Search .......... 55/459, 460, 461, 437, 55/440, 442, 443, 447, 463; 209/143, 144, 210, 211; 210/84, 512 R, 512 M

[56] References Cited

UNITED STATES PATENTS

| | | | |
|---|---|---|---|
| 430,444 | 6/1890 | Smith ................ | 55/461 X |
| 535,099 | 3/1895 | Gale et al. .......... | 55/461 |
| 1,660,687 | 2/1928 | Stebbins .............. | 209/144 |
| 2,767,840 | 10/1956 | Dobson et al. ....... | 209/144 |
| 2,816,490 | 12/1957 | Boadway et al. ..... | 210/512 |
| 2,967,618 | 1/1961 | Vane ..................... | 210/84 |
| 3,672,503 | 6/1972 | Mark .................... | 209/144 |
| 3,789,988 | 2/1974 | Valibouse et al. .... | 210/512 X |

FOREIGN PATENTS OR APPLICATIONS

231,156  5/1910  Germany ........................ 55/461

Primary Examiner—Charles N. Hart
Assistant Examiner—Robert G. Mukai
Attorney, Agent, or Firm—Karl F. Ross; Herbert Dubno

[57] ABSTRACT

A gaseous or liquid fluid to be centrifuged, for the purpose of purification or of separation of different phases, is conducted at high speed in a curved channel past a vortex chamber formed in one of the channel walls at the concave side thereof, this chamber being partly separated from the main fluid path by an overhanging sharp upstream edge and by a possibly rounded downstream edge which extend over the full width of the channel. A body of fluid whirling in this chamber develops a cylindrical core free from entrained solids, or from an accompanying heavier phase, which can be axially extracted from the chamber while the remaining fluid continues its flow through a reduced channel portion which may also be curved and provided with another vortex chamber to repeat the process. Entrained particles may be removed from the solid-enriched residual flow by way of end apertures along the periphery of the vortex chamber and/or at the convex side of the curved channel.

12 Claims, 24 Drawing Figures

CENTRIFUGAL TREATMENT OF FLUIDS

FIELD OF THE INVENTION

My present invention related to a method of and an apparatus for centrifuging a gaseous or liquid fluid, for purposes of purification (i.e., the removal of entrained heavier particles) or for the separation of mutually immiscible phases such as, for example, water and oil.

BACKGROUND OF THE INVENTION

For the centrifugal treatment of such fluids it is known to use cyclone-type separators in which the fluid is axially and tangentially guided through a centrifugation chamber with widely varying radii of curvature. The desired rotary and axial motion is imparted to the fluid stream by vanes or baffles at one axial end of the chamber, the fluid swirling then under its own momentum toward the opposite end. This mode of vortex generation results in complex flow conditions with superimposition of secondary currents and large losses of energy due to collisions and friction along the walls.

OBJECTS OF THE INVENTION

The general object of my present invention is to provide an improved method of and an apparatus for centrifuging a fluid with avoidance of the aforestated drawbacks.

A more particular object is to provide a system of this character in which a stream of raw fluid to be treated can be subjected to several consecutive separation stages, with only a relatively small pressure loss in each stage, for a high yield of the purified fluid or of a desired component thereof.

It is also an object of this invention to provide means in such a system for generating a self-stabilizing vortex requiring no baffles or other guide means within the body of swirling fluid, with resulting minimization of friction and elimination of internal cross-currents.

SUMMARY OF THE INVENTION

These objects are realized, pursuant to my present invention, by passing the fluid to be treated through a curved channel which is provided at its concave side with a transverse recess extending across the full width of that channel, the fluid passing over this recess at a speed sufficient to set up therein a vortical motion tangent to the main fluid flow through the channel. This vortical motion, generated by cavitation with the aid of an overhanging upstream edge which separates the recess from the channel, is centered on an axis parallel to that edge which may therefore be referred to as the centerline of the vortex chamber defined by the recess. The lightest constituents of the fluid stream accumulate in the immediate vicinity of this centerline and can therefore be extracted from the chamber, preferably in axial direction, without materially impeding the continuation of the flow of the remainder of the fluid through a downstream section of the channel. This downstream channel section may also have a concave side provided with a further recess, similar to the first one, to act as a second vortex chamber in cascade with the first one; in this manner, a number of such vortex chambers may be spacedly disposed along a common channel for successive diversion of treated fluid portions from the main stream. Advantageously, the channel narrows after each vortex chamber in order that the fluid stream, diminished in volume by the partial extraction thereof at the chamber exits, can travel at substantially the same speed through the entire system.

If the system is to be used for the removal of entrained solids from a gas to be purified, the extraction of pure gas from the center of each vortex chamber results in the progressive enrichment of the remaining gas with solid particles. The latter, of course, tend to accumulate along the periphery of each vortex chamber as well as on the convex sides of the curved channel portions from which they may be partly removed, according to another feature of my invention, through apertures provided in a channel wall perpendicular to the centerline of the vortex chamber or chambers.

Whereas the upstream edge overhanging the recess preferably forms an acute vertex angle or cusp pointing in the direction of fluid flow, the confronting downstream edge could be more rounded. If both edges are cusps, they may both be tangent to an arc substantially paralleling the opposite (convex) channel side, thus are being complementary to the one encompassed by the peripheral wall of the recess. The periphery of the vortex chamber, lying between these edges, is preferally cylindrically curved and extends over an arc of at least 180°.

According to another feature of my invention, the conduit forming the main channel and its vortex chamber or chambers may be transversely slitted at or just beyond the downstream edge of each chamber, the slit or slits extending across the full channel width and being connected to a source of low pressure in order to aspirate some of the fluid and accelerate its motion around the bend. Such a split may be provided, for example, in a flow divider which splits the fluid stream into two oppositely curved branches, each branch communicating with a respective vortex chamber of a pair of such chambers formed on opposite sides of the insert. An array of such inserts may also be used to divide the fluid streams into a large number of branches and/or to create a meandering channel with vortex chambers facing in different directions.

BRIEF DESCRIPTION OF THE DRAWING

The above and other features of my invention will now be described in detail with reference to the accompanying drawing in which.

SPECIFIC DESCRIPTION

Figure 1:
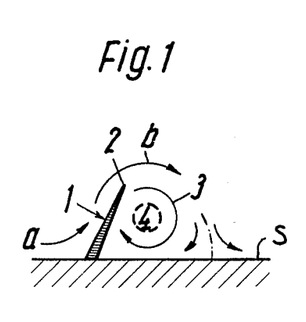
FIG. 1 is a somewhat diagrammatic sectional view of a flow channel, serving to explain the principle underlying my invention.

In FIG. 1, I have illustrated the basic principle underlying my present invention. A fluid stream $a$, traveling across a surface S, strikes a baffle 1 which deflects same upwardly and across its free edge 2 extending completely across the width of the flow. Arrow $b$ indicates how the flow curves around the edge and returns toward surface S on the leeward side of the baffle, a part of the stream being forced by cavitation into a circular motion to form a vortex 3; this is sometimes referred to as ice-cornice effect. The revolving cylindrical body of fluid in the shelter of baffle 1 is centered on an axis in whose immediate vicinity the fluid experiences little centrifugal action. Thus, any separation of phases or entrained solids due to centrifugation in the vortex results in an accumulation of the lightest constituent in a central core 4 whereas the heavier fluid components and/or solids circulate near their periphery of the vortex and eventually re-enter the main stream for further travel along surface S.

Figure 2:
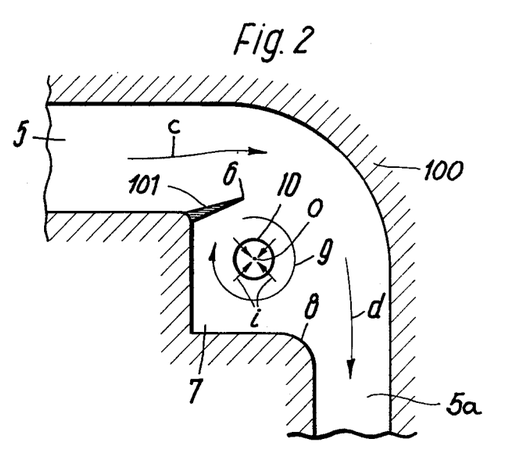
FIG. 2 is a similar view of part of a conduit system embodying structure of the type shown in FIG. 1.

FIG. 2 illustrates the practical application of this principle in a centrifugation system embodying my invention. A conduit 100 forms a curved channel 5 provided on its concave side with a transverse recess or pocket 7 which is overhung by a shelf 101 forming a sharp upstream edge 6; fluid passing through a conduit 5 in the direction of arrow $c$ is partly deflected around the edge 6 into the recess 7 which thereby becomes a vortex chamber containing a revolving fluid body 9 which is centered on an axis O. An axially oriented outlet 10 from chamber 7 enables the continuous removal of the purified or otherwise treated fluid forming the core of the vortex 9, as indicated by arrows $i$; the remainder of the fluid streams past a rounded downstream edge 8, as denoted by arrow $d$, into a channel section 5a whose depth perpendicular to edges 6 and 8 has been reduced to allow for maintenance of substantially the original flow rate, taking into consideration the extraction of some of the fluid through outlet 10. Channel section 5a may carry this residual fluid past one or more additional vortex chambers of the same general type, as illustrated in subsequent Figures.

Figures 3, 6:
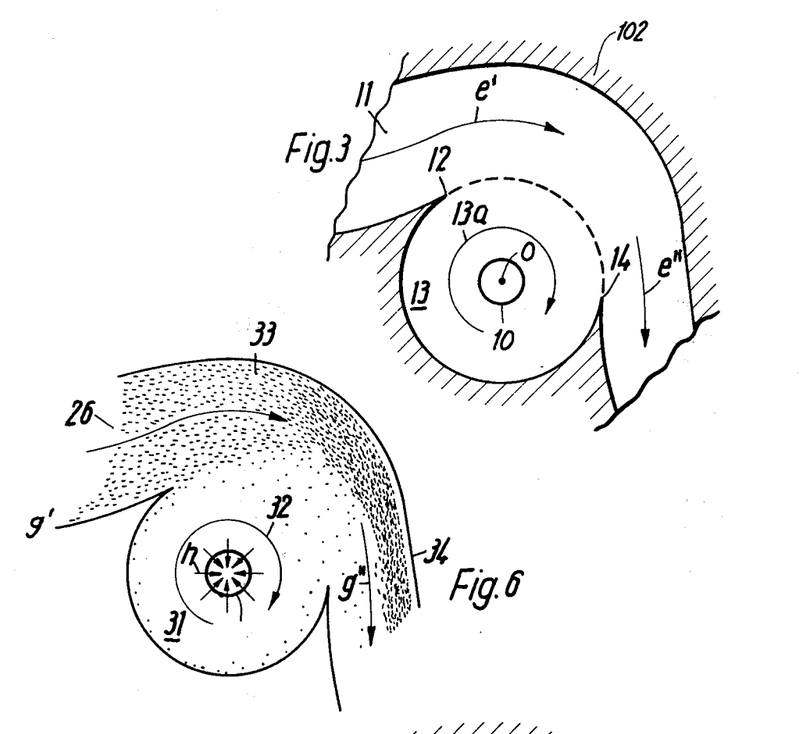
FIG. 3 is a view similar to FIG. 2, showing a modification.
FIGS. 5 and 6 are views similar to FIG. 3, showing the application of the invention to liquid and gaseous fluids, respectively.

FIG. 3 shows a generally similar structure with a conduit 102 forming a curved channel 11, the conduit being again provided with a transverse recess 13 extending over the full width of the channel. The upstream and downstream edges 12 and 14, separating this recess from the main channel, are here both shown with sharp vertex angles bounding the cylindrically curved peripheral wall of vortex chamber 13, this wall extending in the present instance over roughly 225°. Fluid entering the channel 11 at $e'$ and leaving it at $e''$ is partly deflected into the chamber 13 to form therein a vortex 13a centered on an axis O, as described with reference to FIG. 2, with part of the fluid again extracted via an axial outlet 10.

Figure 4:
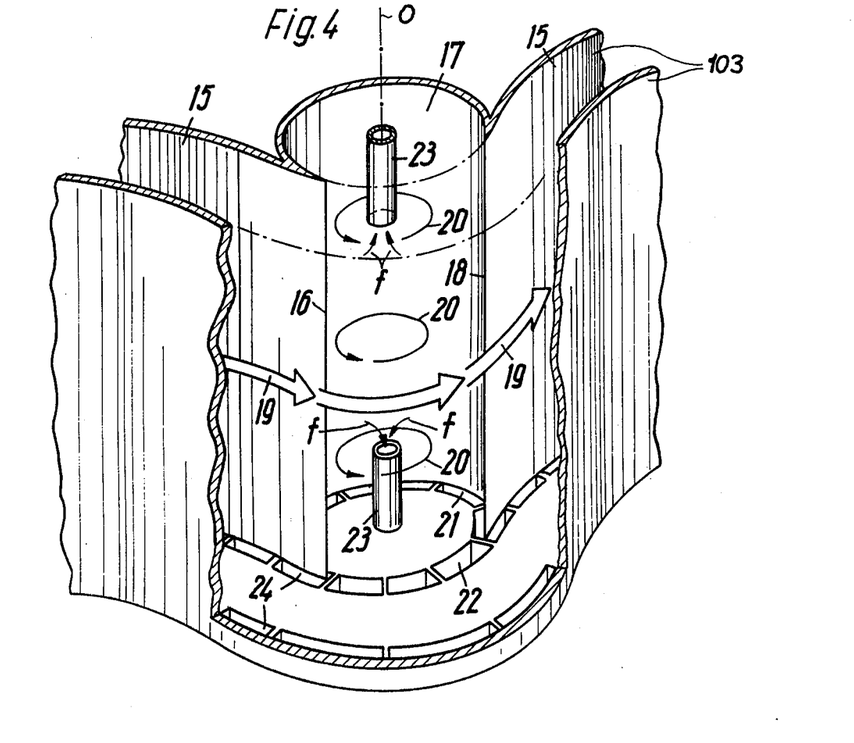
FIG. 4 is a perspective view, partly broken away, of a conduit system similar to that of FIG. 3.

Structural details of a conduit system as shown in FIG. 3 have been illustrated in FIG. 4 which depicts a conduit 103 forming a channel 15 of rectangular cross-section, the fluid flow through that channel being indicated by arrows 19. A vortex chamber 17, of the same basic configuration as chamber 13 in FIG. 3, has upstream and downstream edges 16, 18 and is entered on opposite ends by a pair of tubes 23 centered on the cylinder axis O. Tubes 23 form an outlet, such as that shown at 10 in FIGS. 2 and 3, for a central core of fluid vortex 20 exiting axially from the chamber 17 as indicated by arrows $f$.

If the fluid to be treated is a dust-laden gas such as air, portions thereof circulating along the periphery of chamber 17 and at the convex side of main channel 15 will have a particularly high solids content. Some of this particle-laden fluid may be drawn off or allowed to escape via apertures 21 at the end faces of chamber 17 and apertures 24 at the channel edges, the two sets of slot-shaped apertures merging into larger slots 22 in the region between edges 16 and 18. With an undulating channel 15 as shown, the slots 24 may be alternately disposed along opposite guide surfaces of conduit 103. Slots 21, 22 and 24, all located remote from the chamber axis O, may be duplicated at opposite sides of the channel, i.e., at the bottom and at the top as viewed in FIG. 4. Naturally, the loss of fluid through these slots should be taken into account in the dimensioning of the channel depth which may progressively decrease between successive vortex chambers besides being stepped down from edge 16 to edge 18 of each chamber.

Figure 5:
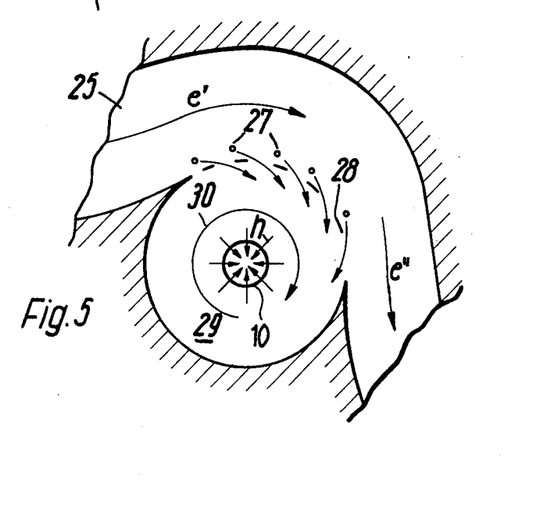

FIG. 5 shows a conduit structure similar to that of FIG. 3, forming a curved channel 25 with vortex chamber 29, traversed by a fluid stream (arrows $e'$ and $e''$) which may be a liquid suspension of particles 27 in a continuous phase. The particles, to the extent that they enter the chamber 29 for entrainment by the vortex 30 generated therein, are centrifugally driven toward the periphery of that vortex and thus tend to concentrate along an arc 28 tangent to the main fluid stream. The inner core of vortex 30 is thus essentially free from such particles so that only the continuous phase is extracted through outlet or outlets 10 as indicated by arrows $h$.

FIG. 6 depicts an analogous situation in a gas stream 33 traversing a similarly curved channel 26 defined by a conduit 34. The stream entering at $g'$ moves past a chamber 31 in which a vortex 32 is set up, with displacement of the mobile solid particles away from the axis of the vortex and toward the convex side of conduit 34. The purified gas can therefore be extracted at outlet 10 as indicated again by arrows $h$.

Figure 7:
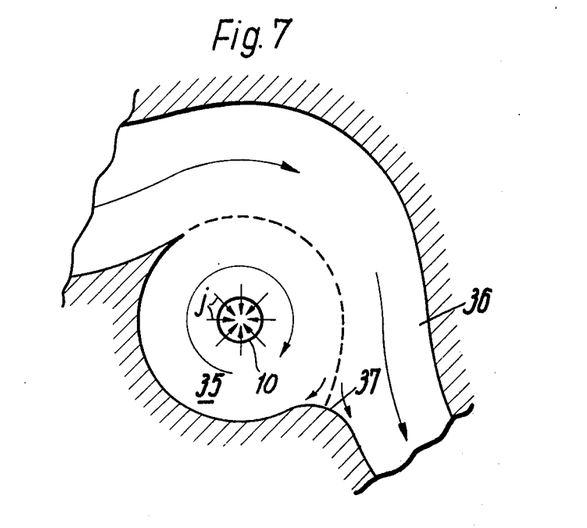
FIGS. 7–11 are further views similar to FIG. 3, illustrating various modifications.

FIG. 7 shows a channel 36 with cylindrically shaped vortex chamber 35, the downstream edge 37 separating the chamber from the channel being here rounded as in the embodiment of FIG. 2. The absence of a sharp edge at that location affords greater control over the proportional amount of fluid branched off the main flow, and drawn into the vortex chamber, by varying the rate of extraction (arrows $j$) with the aid of an adjustable shutter or suction pump in outlet 10.

Figures 8, 10, 11:
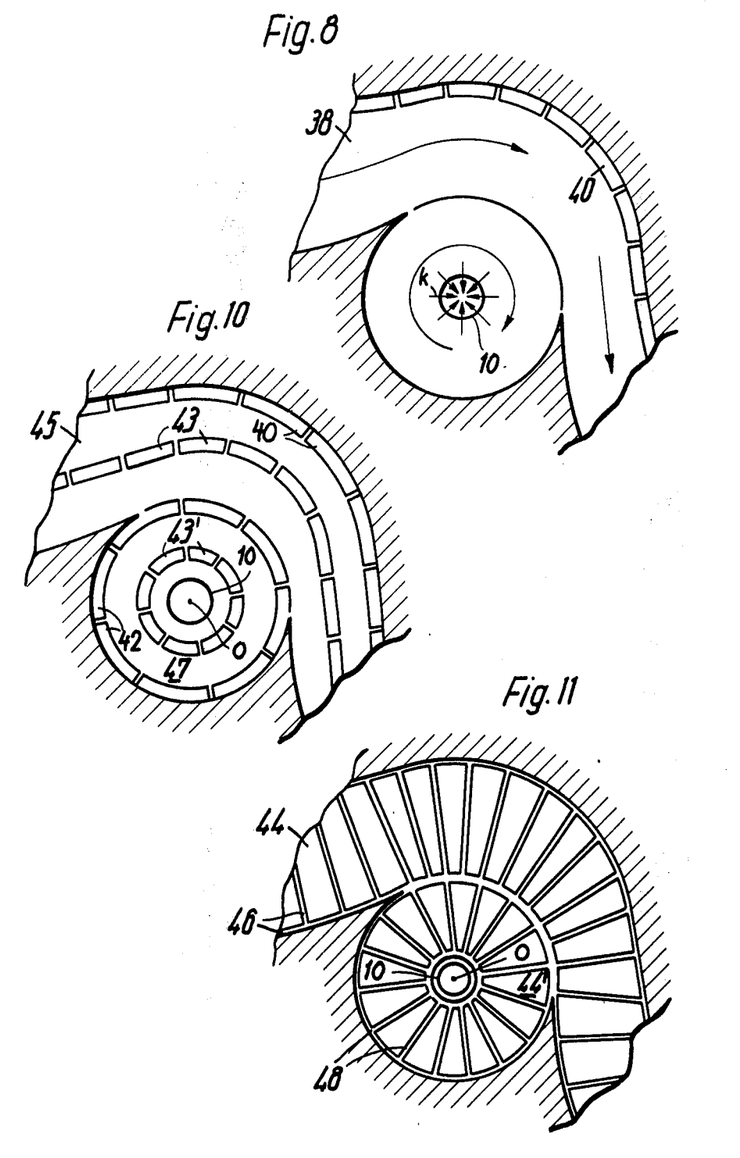
Figure 9:
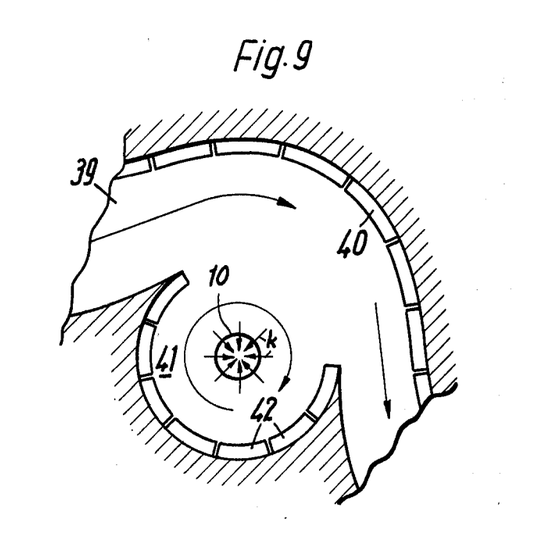

FIG. 8 shows a channel 38 with slots 40, similar to apertures 24 of FIG. 4, disposed along the convex side thereof. FIG. 9 shows a similar channel 39 in which slots 42, corresponding to apertures 21 of FIG. 4, also extend along the periphery of a vortex chamber 41. In both instances the axial extraction of purified or treated fluid through outlets 10 has been indicated by arrows $k$.

FIG. 10 shows a channel 45 with vortex chamber 47 in which slots 40 and 42 of FIGS. 8 and 9 have been supplemented by additional slots 43 at the centerline of the channel and further slots 43' along an intermediate zone of the chamber. According to FIG. 11, the lateral walls of a channel 44 and an associated vortex chamber 44' are intersected by respective arrays of slots 46 and 48, each of these walls thus forming a grid whose solid portions are held together by nonillustrated connecting pieces. In each of these instances, as before, the slots are confined to locations remote from chamber axis O and are separated from outlet 10 through which a relatively light phase can be extracted whereas a relatively heavy phase can exit through the slots. Again, adjustable shutters or pumps may be provided to control the rate of fluid discharge through the axial outlets and through the off-axial slots. The systems of FIGS. 10 and 11 are therefore particularly suitable for the separation of a light and heavy phase of a liquid or gaseous fluid to be treated.

Figures 12, 24:
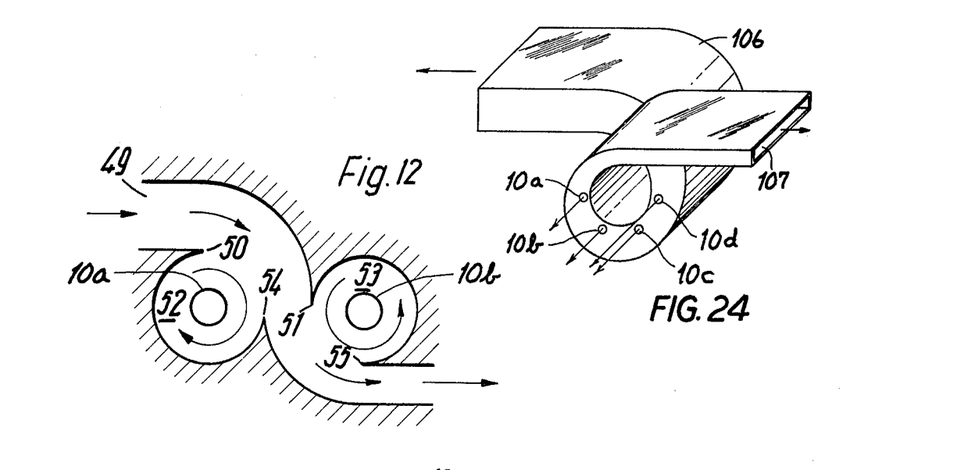
FIGS. 12–14 are sectional views of more complex channel structure according to my invention.
FIG. 24 is a perspective view of a modified conduit to be used in such a system.
Figure 13:
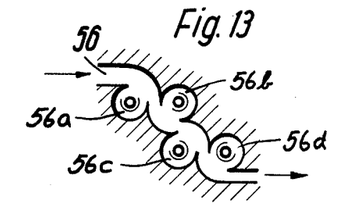

In FIG. 12 I have shown part of an undulating channel 49 with an inversion of curvature between two vortex chambers 52, 53 formed at respective concavities thereof, the first and somewhat larger chamber 52 with axial outlet 10a being formed between upstream and downstream edges 50 and 54 whereas the second chamber 53 with outlet 10b is bounded by edges 51 and 55. FIG. 13 illustrates a further development of this structure in which an undulating channel 56 communicates with four vortex chambers 56a, 56b, 56c and 56d.

Figure 14:
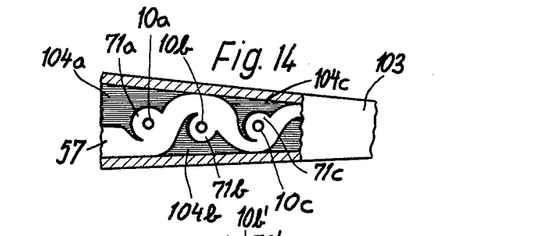
Figure 21:
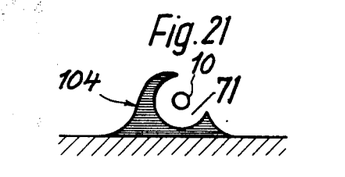

As illustrated in FIG. 14, such an undulating channel 57 may be created in a tapering passage of a conduit 103, having a rectangular profile, by disposing therein a series of inserts 104a, 104b, 104c, etc., provided with undercuts 71a, 71b, 71c etc. centered on axial outlets 10a, 10b, 10c etc. One such insert, whose profile is constant throughout the width of the channel, has been illustrated at 104 in FIG. 21, together with its recess 71 and the corresponding outlet 10.

Figures 15, 16:
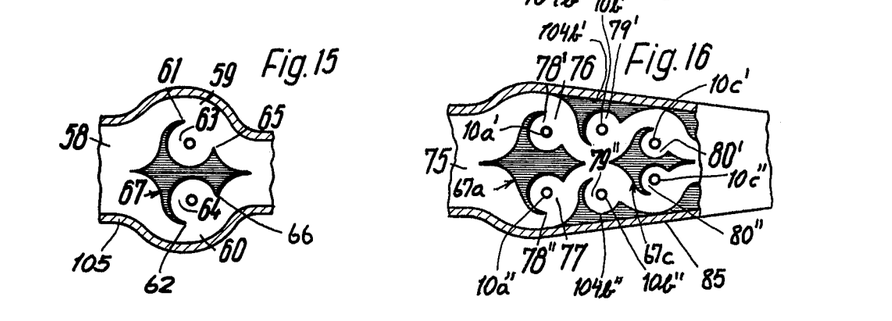
FIG. 15 is a cross-sectional view of a flow-dividing insert to be used in a system according to my invention.
FIGS. 16 and 17 are sectional views of a channel system using inserts of the general type shown in FIG. 15.

FIG. 15 shows part of a conduit 105 whose channel 58 is split by a generally similar but symmetrically profiled insert 67, acting as a flow divider, into two parallel branches 59 and 60 communicating with respective vortex chambers 63 and 64, these chambers being again formed as recesses in the insert itself and being bounded by transverse edges 61, 65 and 62, 66. This splitting of the flow reduces the effective depth/width ratio of the channel and affords more efficient centrifugation. The channel branches are bounded on their convex sides by oppositely bulging sidewalls of conduit 105.

Figure 17:
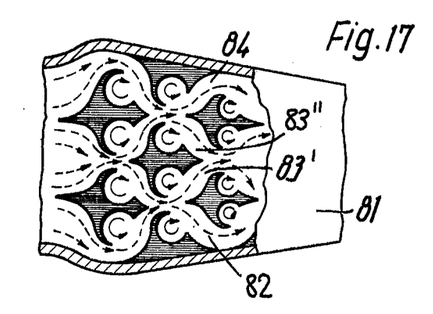

FIG. 16 shows a conduit 85 having its channel 75 similarly split into branches by a pair of cascaded flow dividers 67a, 67c co-operating with two symmetrically disposed inserts 104b', 104b'' to form branches 76 and 77 respectively communicating with vortex chambers 78', 79', 80' and 78'', 79'', 80''; the axial outlets have been indicated at 10a', 10b', 10c' and 10a'', 10b'', 10c''. FIG. 17 depicts a conduit 81 with a still larger number of inserts forming meandering or undulating branches 82, 83', 83'', 84 each communicating with several vortex chambers at the concavities of its bends.

Figures 18, 19, 22:
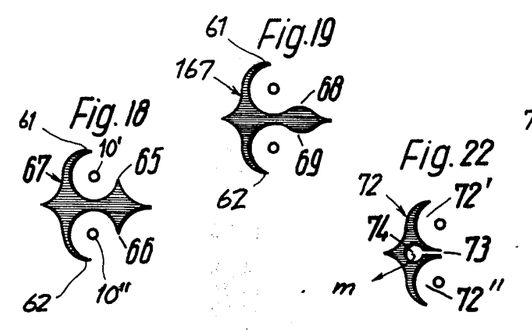
FIGS. 18–22 are views similar to FIG. 15, illustrating a variety of different flow-guiding inserts.
Figure 20:
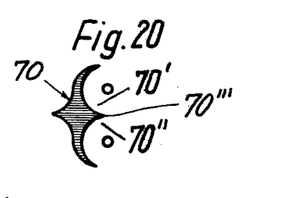

Different configurations of flow dividers have been illustrated in FIGS. 18–20 and 22. FIG. 18 shows the insert 67 of FIG. 15 with its recesses centered on outlets 10' and 10''. FIG. 19 shows a similar insert 167 having the same pointed upstream edges 61, 62 as insert 67 but having rounded downstream edges 68, 69 in lieu of the sharp-angled edges 65, 66 of the former. FIG. 20 shows an insert 70 having vortex chambers 70' and 70'' with approximately semicylindrical peripheries sharing a common downstream edge 70'''. A similar insert 72 with substantially semicylindrical vortex chambers 72' and 72'' is shown in FIG. 22, the common downstream edge of these chambers being slitted at 73 over the full channel width; slit 73 opens into a bore 74 of the insert which in turn communicates with a source of low pressure to exert suction (arrow m) upon the fluid streaming past the vortex chambers, thereby accelerating the flow of that fluid. It will be understood that similar transverse slits could also be provided at the downstream edges of the vortex chambers in other embodiments, e.g., at the edge 37 of FIG. 7.

Figure 23:
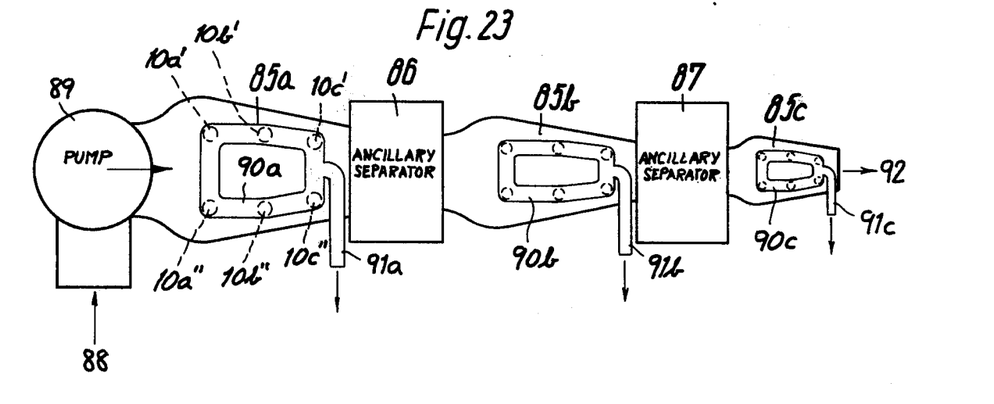
FIG. 23 is a side view of a multistage centrifuging system embodying the principles described with reference to the preceding Figures.

FIG. 23 shows a centrifugation system used for gas purification, with three cascaded conduit sections 85a, 85b, 85c of progressively decreasing average height, each of these sections having the internal and external configuration of the conduit 85 shown in FIG. 16. Ancillary separators 86 and 87 are interposed between these conduit sections; they may be of conventional type, e.g. ultrasonic or electrostatic filters, scrubbing columns or sedimentation chambers. The dust-laden gas stream to be treated is introduced at 88 through a pump 89 and is partly withdrawn, after centrifugation in vortex chambers as described above, via manifolds 90a, 90b, 90c and discharge pipes 91a, 91b, 91c which may also be provided with suction pumps if necessary. Manifold 90a will be seen to communicate with outlets 10a', 10b', 10c' and 10a'', 10b'', 10c'' disposed as in FIG. 16, similar outlets being provided for manifolds 90b and 90c. The residual gas, with a high concentration of impurities, exits at 92.

A conduit system according to my invention may have a wide variety of configurations, including annular and spirally convoluted shapes. A looped conduit 106 has been illustrated, by way of example, in FIG. 24 and is shown provided with a multiplicity of outlets 10a, 10b, 10c, 10d at locations centered on the axes of as many internal vortex chambers of the character described above. Since the sense of curvature of conduit 106 does not change, these vortex chambers are all disposed on the same side of the main channel whose discharge end has been shown at 107.

It will thus be seen that I have provided a system for centrifuging a gaseous or liquid fluid by subjecting a part of a stream of that fluid to a swirling motion in a self-stabilizing vortex which is largely free from secondary currents and is maintained in uniform rotation, over its entire axial length, by its contact with the main fluid stream bypassing the vortex chamber. With the diameter of the vortex chamber on the order of magnitude of the channel depth, as shown throughout the drawing, even a moderate flow rate results in a large angular velocity of the vortex so that centrifugation is highly effective.

I claim:

1. An apparatus for centrifugally treating a fluid, comprising conduit means forming a curved channel of substantially rectangular cross-section connected to a source of fluid to be treated for traversal by said fluid at high speed, said conduit means being provided at a concave side of said channel with at least one transverse recess extending across the full width of said channel, said recess being partly separated from said channel by a transverse upstream edge overhanging said recess and by a transverse downstream edge confronting the oncoming fluid stream, and extraction means opening into said recess adjacent a centerline thereof for axially removing a portion of a body of fluid circulating in said recess, the cross-section of said channel being larger at said upstream edge than at said downstream edge, said recess having a generally part-cylindrical periphery extending over an arc of at least 180°, said channel being fully open toward said recess over a complementary arc lying between said upstream and downstream edges, at least said upstream edge forming an acute vertex angle pointed in a direction tangent to said complementary arc.

2. An apparatus as defined in claim 1 wherein the width of said channel parallel to said edges is substantially greater than its depth perpendicular thereto.

3. An apparatus as defined in claim 1 wherein said conduit means includes at least one wall perpendicular to said centerline provided with apertures remote from said centerline for the removal of parts of said fluid stream from said channel.

4. An apparatus as defined in claim 1 wherein said conduit means includes a flow divider in said channel splitting said fluid stream into two oppositely curved branches, said recess being formed in said flow divider and being duplicated on opposite sides thereof for respective communication with said branches.

5. An apparatus as defined in claim 4 wherein said flow divider is provided with a slot parallel to said edges at a downstream junction of said branches and with suction means communicating with said slot for accelerating the fluid stream around said flow divider.

6. An apparatus as defined in claim 1, further comprising suction means opening into said channel adjacent said downstream edge.

7. An apparatus as defined in claim 1 wherein said extraction means comprises an open-ended tube extending into said recess along said centerline.

8. An apparatus for centrifugally treating a fluid, comprising conduit means of substantially rectangular cross-section forming a curved channel connected to a source of fluid to be treated for traversal by said fluid at high speed, said conduit means being provided at a concave side of said channel with at least one transverse recess extending across the full width of said channel, said recess being partly separated from said channel by a transverse upstream edge overhanging said recess and by a transverse downstream edge confronting the oncoming fluid stream, said upstream edge forming an acute vertex angle pointing in the direction of fluid flow, said conduit means being provided at said downstream edge with a slot paralleling said upstream edge, suction means communicating with said slot for accelerating the fluid flow, and extraction means opening into said recess adjacent a centerline thereof for axially removing a portion of a body of fluid circulating in said recess.

9. An apparatus for centrifugally treating a fluid, comprising:
a conduit of substantially rectangular cross-section with a pair of sidewalls bulging in opposite directions, said conduit being connected to a source of fluid to be treated for traversal by said fluid at high speed;
a flow divider in said conduit defining with said bulging sidewalls a pair of oppositely curved channels, said flow divider being provided at a concave side of each channel with a transverse recess extending across the full width of the channel, said recess being partly separated from the corresponding channel by a transverse upstream edge overhanging said recess and by a transverse downstream edge confronting the oncoming fluid stream; and
extraction means opening into each recess adjacent a centerline thereof for axially removing a portion of a body of fluid circulating in the respective recess.

10. An apparatus as defined in claim 9 wherein said upstream edge forms an acute vertex angle pointing in the direction of fluid flow.

11. An apparatus as defined in claim 9 wherein said recess has a generally cylindrical periphery extending over at least 180°.

12. An apparatus as defined in claim 9 wherein said flow divider is provided with a slot parallel to said edges between the downstream edges of both recesses, further comprising suction means communicating with said slot for accelerating the fluid stream around said flow divider.

* * * * *